(12) United States Patent
Zhang

(10) Patent No.: US 11,477,823 B2
(45) Date of Patent: Oct. 18, 2022

(54) RANDOM ACCESS METHOD, USER EQUIPMENT, BASE STATION, STORAGE MEDIUM, AND ELECTRONIC DEVICE

(71) Applicant: ZTE Corporation, Shenzhen (CN)

(72) Inventor: Li Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 21 days.

(21) Appl. No.: 17/254,569

(22) PCT Filed: Jun. 21, 2019

(86) PCT No.: PCT/CN2019/092375
§ 371 (c)(1),
(2) Date: Dec. 21, 2020

(87) PCT Pub. No.: WO2019/242762
PCT Pub. Date: Dec. 26, 2019

(65) Prior Publication Data
US 2021/0274550 A1 Sep. 2, 2021

(30) Foreign Application Priority Data

Jun. 21, 2018 (CN) .......................... 201810645967.3

(51) Int. Cl.
*H04W 74/08* (2009.01)
*H04W 72/02* (2009.01)
(Continued)

(52) U.S. Cl.
CPC ....... *H04W 74/0816* (2013.01); *H04W 72/02* (2013.01); *H04W 72/0453* (2013.01); *H04W 74/0841* (2013.01); *H04W 80/02* (2013.01)

(58) Field of Classification Search
CPC ..... H04L 5/001; H04L 5/0091; H04L 5/0053; H04L 5/0055; H04W 74/0816;
(Continued)

(56) References Cited

U.S. PATENT DOCUMENTS

| | | | |
|---|---|---|---|
| 10,045,346 B1* | 8/2018 | Marupaduga | H04L 43/0852 |
| 2012/0307774 A1* | 12/2012 | Zhao | H04W 74/08 |
| | | | 370/329 |

(Continued)

FOREIGN PATENT DOCUMENTS

| | | |
|---|---|---|
| CN | 102150466 A | 8/2011 |
| CN | 107371273 A | 11/2017 |
| EP | 3573406 A1 | 11/2019 |

OTHER PUBLICATIONS

International Search Report for corresponding application PCT/CN2019/092375 filed Jun. 21, 2019; dated Sep. 10, 2019.
(Continued)

*Primary Examiner* — Kan Yuen
(74) *Attorney, Agent, or Firm* — Cantor Colburn LLP

(57) ABSTRACT

The present application provides a random access method, a UE, a base station, a storage medium, and an electronic device. The method includes that: in a random access process, a first resource is selected from multiple radio resources, wherein the radio resources include either or a combination of: Band Width Parts (BWPs) and carrier resources; a first message is sent to a base station by using the first resource; and a second message sent by the base station is received, wherein the second message carries indication information of a second resource.

19 Claims, 5 Drawing Sheets

In a random access process, select a first resource from multiple radio resources, and send a first message to a base station by using the first resource, wherein the radio resources include either or a combination of: BWPs and carrier resources — S202

Receive a second message sent by the base station, wherein the second message carries indication information of a second resource — S204

(51) Int. Cl.
*H04W 72/04* (2009.01)
*H04W 80/02* (2009.01)

(58) Field of Classification Search
CPC ......... H04W 74/0808; H04W 74/0833; H04W 72/02; H04W 72/0453; H04W 72/0841; H04W 72/042; H04W 72/12; H04W 80/02
See application file for complete search history.

(56) References Cited

U.S. PATENT DOCUMENTS

| | | | | |
|---|---|---|---|---|
| 2013/0064191 | A1* | 3/2013 | Jeong | H04W 74/08 370/328 |
| 2013/0195071 | A1* | 8/2013 | Ohta | H04W 74/006 370/329 |
| 2015/0245307 | A1 | 8/2015 | Chen | |
| 2016/0227581 | A1* | 8/2016 | Lee | H04B 7/2612 |
| 2017/0006599 | A1* | 1/2017 | Dinan | H04W 56/0045 |
| 2017/0187494 | A1* | 6/2017 | Tirronen | H04W 72/0413 |
| 2018/0227944 | A1* | 8/2018 | Yerramalli | H04W 72/1268 |
| 2018/0270866 | A1* | 9/2018 | Loehr | H04W 74/0833 |
| 2019/0045552 | A1* | 2/2019 | Blankenship | H04L 1/08 |
| 2019/0208548 | A1* | 7/2019 | Shih | H04W 74/004 |

OTHER PUBLICATIONS

European Search Report for corresponding application EP 19 82 3537; Report dated Mar. 10, 2022.

Intel Corporation, "Random access procedure for NR-u", 3GPP TSG-RAN NR meeting #102, Busan Korea, May 21-25, 2018, R2-1807355.

Oppo, "Discussion on BWP configuration and mobility with BWP operation", 3GPP RSG-RAN2#100, Reno, USA Nov. 27 to Dec. 1, 2017, R2-1712250.

ZTE, "Consideration on channel access procedure for NR-U", 3GPP TSG RAN WG2 Meeting #102, Busan, Korea, May 21-25, 2018, R2-1807253.

\* cited by examiner

| R | R | R | R | R | R | TAC |
|---|---|---|---|---|---|---|
| TAC ||||||||
| TAC || ID ||| UL Grant |||
| UL Grant |||||||
| UL Grant |||||||
| UL Grant |||| ID | UL Grant ||
| UL Grant |||||||
| UL Grant |||||||
| UL Grant |||||||
| Temporary C-RNTI |||||||
| Temporary C-RNTI |||||||

Fig. 8

| R | R | R | TAC ||||
|---|---|---|---|---|---|---|
| TAC |||||| ID |
| ID | UL Grant ||||||
| UL Grant |||||||
| UL Grant |||||||
| UL Grant | ID ||| UL Grant |||
| UL Grant |||||||
| UL Grant |||||||
| UL Grant |||| ID | UL Grant ||
| UL Grant |||||||
| UL Grant |||||||
| UL Grant |||||||
| Temporary C-RNTI |||||||
| Temporary C-RNTI |||||||

Fig. 9

| TAC | | |
|---|---|---|
| TAC | | ID |
| UL Grant | | |
| UL Grant | | |
| UL Grant | | ID |
| ID | UL Grant | |
| UL Grant | | |
| UL Grant | | |
| UL Grant | ID | UL Grant |
| UL Grant | | |
| UL Grant | | |
| UL Grant | ID | UL Grant |
| UL Grant | | |
| UL Grant | | |
| UL Grant | | |
| Temporary C-RNTI | | |
| Temporary C-RNTI | | |

Fig. 10

RANDOM ACCESS METHOD, USER EQUIPMENT, BASE STATION, STORAGE MEDIUM, AND ELECTRONIC DEVICE

CROSS-REFERENCE TO RELATED APPLICATIONS

The present application claims priority to Chinese patent application No. 201810645967.3, filed before the China National Intellectual Property Administration (CNIPA) on Jun. 21, 2018, the disclosure of which is hereby incorporated by reference in its entirety.

TECHNICAL FIELD

The present application relates to the field of communications, in particular to a random access method, User Equipment (UE), a base station, a storage medium, and an electronic device.

BACKGROUND

Before any node uses resources in an unauthorized carrier, Listen Before Talk (LBT) needs to be performed to detect whether a channel is idle or busy. If the channel is busy, transmission is not performed to avoid strong interference to other nodes. If the channel is idle, the corresponding transmission can be performed. For a random access process, LBT needs to be performed before each message is sent. Taking a 4-step Random Access Channel (RACH) process as an example, as shown in FIG. 1 which is a schematic diagram of a random access process in related technologies of the present application, the messages numbered ①②③④ respectively correspond to msg1 to msg4. Because LBT needs to be performed before each message is sent, LBT has to be performed four times in the entire RACH process, which increases a random access delay.

For the above problem existing in related technologies, no effective solution has been found yet.

SUMMARY

The embodiments of the disclosure provide a random access method, a UE, a base station, a storage medium, and an electronic device.

According to an embodiment of the present application, a random access method is provided, which includes the following operations. In a random access process, a first resource is selected from multiple radio resources, and a first message is sent to a base station by using the first resource. The radio resources include either or a combination of: Band Width Parts (BWPs) and carrier resources. A second message sent by the base station is received. The second message carries indication information of a second resource.

According to an embodiment of the present application, a random access method is provided, which includes the following operations. In a random access process of User Equipment (UE), a first message sent by the UE is received. A second message is generated. A third resource is selected from multiple radio resources, and the second message is sent to the UE by using the third resource. The radio resources include either or a combination of: BWPs and carrier resources. The second message carries indication information of a second resource.

According to another embodiment of the present application, a UE is provided, which includes a first sending module and a receiving module. The first sending module is configured to select, in a random access process, a first resource from multiple radio resources, and send a first message to a base station by using the first resource. The radio resources include either or a combination of: BWPs and carrier resources. The receiving module is configured to receive a second message sent by the base station. The second message carries indication information of a second resource.

According to another embodiment of the present application, a base station is provided, which includes: a receiving module, a generating module and a second sending module. The receiving module is configured to receive, in a random access process of a UE, a first message sent by the UE. The generating module is configured to generate a second message. The second sending module is configured to select a third resource from multiple radio resources, and send the second message to the UE by using the third resource. The radio resources include either or a combination of: BWPs and carrier resources. The second message carries indication information of a second resource.

According to yet another embodiment of the present application, a storage medium is also provided. The storage medium stores a computer program. The computer program is configured to perform, when running, operations in any of the above method embodiments.

According to yet another embodiment of the present application, an electronic device is also provided, which includes a memory and a processor. The memory stores a computer program. The processor is configured to run the computer program to perform operations in any of the above method embodiments.

Through the scheme in the embodiments of the present application, a resource used to send a first message to a base station is selected from multiple resources, in which different resources correspond to different transmission opportunities, so that an access delay or a synchronous delay in the random access process may be reduced. In this way, the technical problem of excessively long delay in random access in related technologies can be solved, and the access time of the UE can be shortened.

BRIEF DESCRIPTION OF THE DRAWINGS

The accompanying drawings described here are used for providing deeper understanding of the present application, and constitute a part of the present application. Schematic embodiments of the present application and description thereof are used for illustrating the present application and are not intended to form an improper limit to the present application. In the accompanying drawings:

FIG. 8 is a schematic diagram of an MAC RAR format indicating two carriers/BWPs in an embodiment of the disclosure.

FIG. 9 is a schematic diagram of an MAC RAR format indicating three carriers/BWPs in an embodiment of the disclosure.

FIG. 10 is a schematic diagram of an MAC RAR format indicating four carriers/BWPs in an embodiment of the disclosure.

DETAILED DESCRIPTION OF THE EMBODIMENTS

The present application is elaborated below with reference to the accompanying drawings and embodiments. It is to be noted that the embodiments in the application and characteristics in the embodiments may be combined without conflicts.

It should be noted that the specification and claims of the application and terms "first", "second", etc. in the foregoing drawings are used for distinguishing similar objects rather than describing a specific sequence or a precedence order.

Embodiment 1

A network architecture in which the embodiments of the present application are implemented includes a UE and a base station. The UE interacts with the base station.

Figure 1:
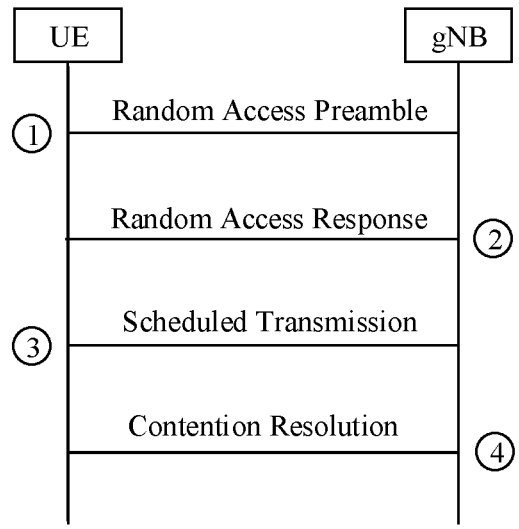
FIG. 1 is a schematic diagram of a random access process in related technologies of the present application.
Figure 2:
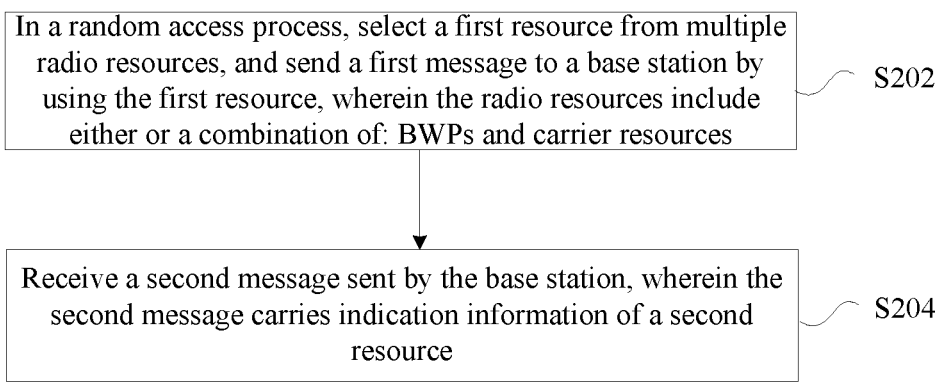
FIG. 2 is a flowchart of a random access method according to an embodiment of the disclosure.

In the present embodiment, a random access method is provided. FIG. 2 is a flowchart of the random access method according to an embodiment of the disclosure. As shown in FIG. 2, the flow includes the following operations.

At operation S202, in a random access process, a first resource is selected from multiple radio resources, and a first message is sent to a base station by using the first resource. The radio resources include either or a combination of: BWPs and carrier resources.

At operation S204, a second message sent by the base station is received. The second message carries indication information of a second resource.

Through the above operations, a resource used to send a first message to a base station is selected from multiple resources, in which different resources correspond to different transmission opportunities, so that an access delay or a synchronous delay in the random access process may be reduced. In this way, the technical problem of excessively long delay in random access in related technologies can be solved, and the access time of the UE can be shortened.

In exemplary implementations of the embodiment, the executer of the above operations may be, but is not limited to be, a UE such as a mobile phone.

In exemplary implementations of the embodiment, the operation that the first resource is selected from the multiple radio resources includes at least one of the following operations: at least one first BWP is selected from multiple BWPs; and at least one first carrier is selected from multiple carrier resources. There are two cases for selecting the at least one first BWP from the multiple BWPs. In case 1, one BWP is selected, LBT is performed on the selected BWP, and a message is sent. In case 2, multiple BWPs are selected, the LBT is performed on the multiple BWPs, and data is sent in a case of LBT success.

In exemplary implementations of the embodiment, the operation that the at least one first BWP is selected from the multiple BWPs includes that: the at least one first BWP is selected from the multiple BWPs based on at least one of the following: a BWP selection threshold, a BWP load, and an LBT count value. The LBT count value is used for indicating a success rate of LBT or a failure rate of LBT.

In exemplary implementations of the embodiment, the operation that the at least one first carrier is selected from the multiple carrier resources includes that: the at least one first carrier is selected from the multiple carrier resources based on at least one of the following: a carrier selection threshold, a carrier load, a success rate of LBT, and a failure rate of LBT.

In exemplary implementations of the embodiment, the operation that the first message is sent to the base station by using the first resource includes that: a preamble is sent to the base station by using the first resource.

In exemplary implementations of the embodiment, the operation that the second message sent by the base station is received includes one of the following operations: an MAC RAR sent by the base station is received; and a Time Advance (TA), a Temporary Cell Radio Network Temporary Identifier (TC-RNTI) and a contention resolution sent by the base station are received.

In exemplary implementations of the embodiment, the second message carries a resource location of the second resource and a resource identifier of the second resource.

In exemplary implementations of the embodiment, after the second message sent by the base station is received, the method may further include that: a third message is sent to the base station by using the second resource.

In exemplary implementations of the embodiment, when the third message is Msg3, the method may further include that: the Msg3 is sent based on a result of performing the LBT, and in a case of LBT success, the Msg3 is sent repeatedly. A maximum number of repetitions of sending the Msg3 is carried in the second message, and may be in a Remaining Minimum System Information (RMSI), or an MAC RAR, or a retransmission uplink scheduling grant (UL grant) for the Msg3.

In exemplary implementations of the embodiment, the maximum number of repetitions is configured through a system message, or is carried through a retransmission UL grant of the Msg3 or an UL grant in an MAC RAR.

Figure 3:
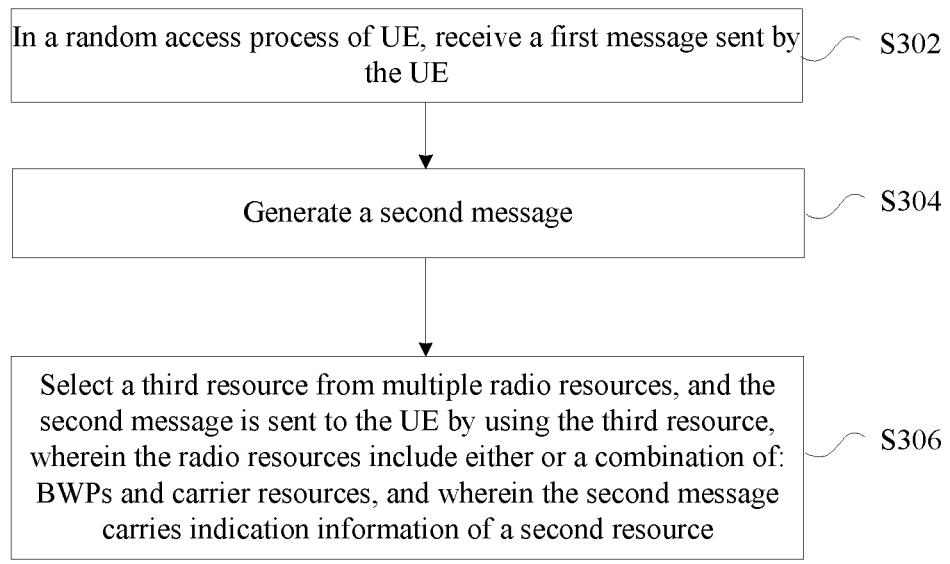
FIG. 3 is a flowchart of another random access method according to an embodiment of the disclosure.

In the present embodiment, another random access method is provided. FIG. 3 is a flowchart of another random access method according to an embodiment of the disclosure. As shown in FIG. 3, the flow includes the following operations.

At operation S302, in a random access process of a UE, a first message sent by the UE is received.

At operation S304, a second message is generated.

At operation S306, a third resource is selected from multiple radio resources, and the second message is sent to the UE by using the third resource. The radio resources include either or a combination of: BWPs and carrier resources. The second message carries indication information of a second resource.

In exemplary implementations of the embodiment, the second resource may be used to send a third message (for example, the Msg3).

In exemplary implementations of the embodiment, an operation of selecting the second resource from the multiple radio resources may include at least one of the following operations: at least one second BWP is selected from multiple BWPs; and at least one second carrier is selected from multiple carrier resources.

In exemplary implementations of the embodiment, the operation that the at least one second BWP is selected from the multiple BWPs includes that: the at least one second BWP is selected from the multiple BWPs based on at least one of the following: a BWP selection threshold, a BWP load, and an LBT count value.

In exemplary implementations of the embodiment, the operation that the at least one second carrier is selected from the multiple carrier resources includes that: the at least one second carrier is selected from the multiple carrier resources based on at least one of the following: a carrier selection threshold, a carrier load, a success rate of LBT, and a failure rate of LBT.

In exemplary implementations of the embodiment, before the second message is generated, the method may further include one of the following operations. The second resource is selected from multiple radio resources, wherein the second message carries the indication information of the second resource (in this case, the second resource is selected and indicated to the UE by the base station). The base station indicates to the UE that the second resource is the resource used to send the first message (in this case, the base station directly indicates the UE to directly use the same resource used when sending Msg1 to send the first message, herein the same resource may be a resource in the same UL BWP, but for the Msg1 and the Msg3, the resource location and the resource number may be different). The second resource is used for the UE to send the third message.

In exemplary implementations of the embodiment, when the third message is the Msg3, the method may further include that: a maximum number of repetitions of the Msg3 is configured by one of the following: a system message, an MAC RAR, and a retransmission grant of the Msg3. The maximum number of repetitions is used to indicate the maximum number of times that the UE sends the Msg3 repeatedly.

Through the above description of the implementations, those skilled in the art may clearly know that the method according to the above embodiments may be implemented by means of software plus a necessary common hardware platform, or certainly by means of hardware; but in many cases, the former is the better implementation. Based on this understanding, the essence of the technical solution of the present application or the part of technical solution of the present application making a contribution to the related technology can be embodied in the form of software product. The computer software product may be stored in a storage medium (for example, a Read-Only Memory (ROM)/Random Access Memory (RAM), a magnetic disk, and a compact disc) and includes a number of instructions to make a computer device (which can be a personal computer, a server or a network device, etc.) perform all or part of the method in each embodiment of the disclosure.

Embodiment 2

The present embodiment provides a random access device, for example, a UE or a base station, which is configured to implement the above embodiments and exemplary implementations. The embodiments which have been elaborated will not be repeated here. The term "module" used below can realize a combination of software and/or hardware with an intended function. Although the device described in the following embodiment is preferentially realized through software, the realization through hardware or a combination of software and hardware is possible and conceivable.

Figure 4:
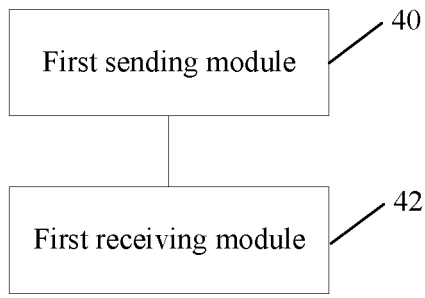
FIG. 4 is a structure diagram of a UE according to an embodiment of the disclosure.

FIG. 4 is a structure diagram of a UE according to an embodiment of the disclosure. As shown in FIG. 4, the device includes: a first sending module 40 and a first receiving module 42. The first sending module 40 is configured to select, in a random access process, a first resource from multiple radio resources, and send a first message to a base station by using the first resource. The radio resources include either or a combination of: BWPs and carrier resources. The first receiving module 42 is configured to receive a second message sent by the base station. The second message carries indication information of a second resource. In exemplary implementations of the embodiment, the second resource is used to send a third message.

Figure 5:
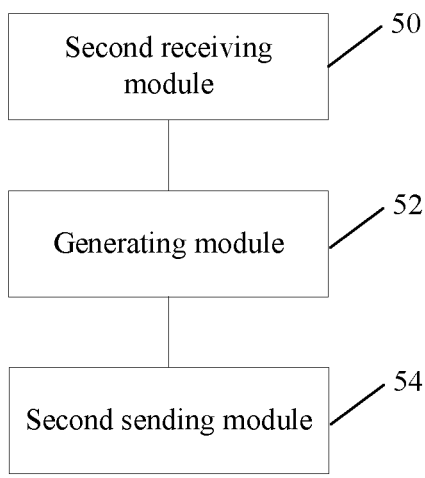
FIG. 5 is a structure diagram of a base station according to an embodiment of the disclosure.

FIG. 5 is a structure diagram of a base station according to an embodiment of the disclosure. As shown in FIG. 5, the device includes: a second receiving module 50, a generating module 52 and a second sending module 54. The second receiving module 50 is configured to receive, in a random access process of a UE, a first message sent by the UE. The generating module 52 is configured to generate a second message. The second sending module 54 is configured to select a third resource from multiple radio resources, and send the second message to the UE by using the third resource. The radio resources include either or a combination of: BWPs and carrier resources. The second message carries indication information of a second resource.

In exemplary implementations of the embodiment, the second resource is used for the UE to send a third message.

It is to be noted that, each of the above modules may be realized by software or hardware. For the latter, each of the above modules may be realized by, but not limited to, the following way: all of the above modules are in the same processor; or, the above modules are respectively in different processors based on any combination form.

Embodiment 3

The present embodiment provides a signal sending method and device, which may reduce a random access delay, enable faster network access or synchronization, and enhance operations in a random access process, for example, increase the number of repetitions or transmission opportunities.

For the transmission of a preamble, multiple transmission opportunities may be provided in the time domain or the frequency domain. In the frequency domain, multiple carriers or multiple BWPs may be used, that is, multiple preambles may be sent on different carriers or BWPs. If the base station is configured with multiple carriers or multiple BWPs, there is a problem on how to select the carrier or the BWP. A carrier may be selected from multiple carriers based on a carrier selection threshold, a carrier load, a failure rate of LBT, a success rate of LBT, and so on. A BWP may be selected from multiple BWPs based on a set BWP selection threshold, a BWP load, a failure rate of LBT, a success rate of LBT, and so on. Similarly, for the Msg2, the Msg3 and Msg4, the carrier and the BWP may be selected by using a similar scheme.

For multiple transmission opportunity attempts of the Msg3, the base station is required to provide the resources of multiple carriers or multiple BWPs for selection. Then, if the base station indicates the resources of multiple carriers or multiple BWPs through the MAC RAR, an MAC RAR format defined by the current NR needs to be modified. The MAC RAR format supporting the indication of a maximum of four carriers or four BWPs may be considered at present. The corresponding MAC RAR format varies depending on the number of carriers or BWPs that can be indicated.

The LBT may fail when a preamble is sent. In the case of LBT failure, a lower layer reports the LBT failure to the MAC. After the MAC receives the LBT failure, if an RAR window is not started yet, a RACH process may be initiated again without the need of starting RAR window.

When the transmission of the preamble fails, the MAC receives the LBT failure, and in this case, the counts for the PREAMBLE_TRANSMISSION_COUNTER and PREAMBLE_POWER_RAMPING_COUNTER do not increase. Another counter, namely LBT_Failure_Counter, is added. In the case of LBT failure, the count for the LBT_Failure_Counter needs to be incremented by 1. Also, the base station needs to configure the UE with an LBT failure threshold. When either the count for the PREAMBLE_TRANSMISSION_COUNTER or LBT_Failure_Counter reaches the threshold, the MAC needs to report a random access problem to an upper layer, so that the upper layer carries out a corresponding subsequent operation.

To improve the transmission reliability of the Msg3, the number of repetitions of the Msg3 may be configured through a system message or a retransmission grant of the Msg3.

To increase the transmission opportunities or the number of repetitions of the Msg3, the base station may configure the transmission opportunities or the number of repetitions through a system message, or an MAC RAR, or a retransmission grant of the Msg3. After the UE receives the message, the MAC instructs the lower layer to perform the corresponding transmission. In the case of LBT failure, the MAC layer continues to instruct the lower layer to perform the corresponding transmission until the maximum transmission opportunity or the maximum number of repetitions is reached.

The present embodiment also includes the following implementation modes.

Implementation mode 1 (selecting from multiple BWPs in a cell, one BMP being selected, applied to the case of 4-step RACH)

To increase a random access success rate, the BWP is selected before each message is sent. A main scenario of the implementation mode is the selection from multiple BWPs in a cell, taking a 4-step RACH process as an example. The implementation mode includes the following operations.

At operation 1, the UE selects a BWP according to a threshold, a channel occupancy rate or a failure or success rate of the LBT. For example, the BWP with low load is selected based on the channel occupancy rate. After the selection, preamble and Physical Random Access Channel (PRACH) resources are selected according to RACH common configuration information of the BWP. After the selection is completed, the selection result is indicated to the lower layer, and then the lower layer sends the preamble to the base station according to the indication from the MAC.

As another example, if Reference Signal Receiving Power (RSRP) of a downlink measurement result for a BWP exceeds a certain threshold, the BWP may be selected as a candidate BWP. If there are multiple BWPs meeting conditions, other factors may be taken into account to perform further selection or a random one of the multiple BWPs may be selected.

As another example, energy or signal detection is performed at the UE side, if the detection result exceeds a certain threshold, it is considered that the channel is occupied. The channel occupancy rate within a period of time is detected, and if the channel occupancy rate reaches a certain threshold, the load is considered to be heavy. If there are multiple BWPs meeting conditions, other factors may be taken into account to perform further selection or a random one of the multiple BWPs may be selected.

As another example, statistics on the LBT results within a period of time may be collected to obtain the failure or success rate of the LBT. For example, the total number of LBT, the number of successful LBT and the number of failed LBT within 200 ms may be counted, and then the failure or success rate of the LBT may be calculated. The base station may configure a selection threshold. If the counted success rate of LBT of a BWP is above the threshold, the BWP may be selected. If there are multiple BWPs for which the success rate of LBT is above the threshold, other factors may be taken into account to perform further selection or a random one of the multiple BWPs may be selected.

At operation 2, after receiving the Msg1 from the BWP, the base station allocates the resources used by the Msg3, and generates an MAC RAR message. Then, the base station selects a Downlink (DL) BWP for sending the MAC RAR. The BWP may be selected based on a threshold, a channel occupancy rate, or a failure or success rate of the LBT.

For example, energy or signal detection is performed at the base station side, if the detection result exceeds a certain threshold, it is considered that the channel is occupied. The channel occupancy rate within a period of time is detected, and if the channel occupancy rate reaches a certain threshold, the load is considered to be heavy.

As another example, statistics on the results of LBT within a period of time are collected at the base station side, for example, the number of performing the LBT, the number of successful LBT and the number of failed LBT within 200 ms are counted, and then the failure or success rate of the LBT are calculated based on the counting result. When the success rate of LBT reaches a certain threshold, the BWP may be selected as the DL BWP used for sending the MAC RAR. If multiple BWPs are selected, other factors may be taken into account to perform further selection or a random one of the multiple BWPs may be selected.

In the embodiment, when the base station allocates the resources used by the Msg3, the base station may allocate resources used by the Msg3 on the BWP used by the Msg1. Alternatively, the base station may select one BWP based on an uplink measurement result and then allocate the resources used by the Msg3 on the selected BWP. Alternatively, the base station may select multiple BWPs, and allocate the resources used by the Msg3 on all the multiple BWPs. After the selection is completed, the selection result is carried in a MAC RAR message.

In the embodiment, multiple opportunities may be given for the transmitting of the MAC RAR, that is, if the LBT fails, the LBT is performed again, until the LBT succeeds or the number of times of LBT attempt reaches a certain number of attempt opportunities. The MAC RAR is sent only once.

At operation 3, after receiving the MAC RAR, the UE parses the MAC RAR, and performs preamble matching. If the Msg2 is received successfully, the UE generates a corresponding Msg3. The UE selects the BWP used by the Msg3 according to the indication in the MAC RAR. If there is only one BWP, then the UE sends the Msg3 on the BWP. If multiple BWPs are indicated, the UE may select a BWP based on the channel occupancy rate or the failure or success rate of the LBT, and then send the Msg3 on the selected BWP.

In the operation, the selection of BWP based on the channel occupancy rate or the failure or success rate of the LBT is the same as that described in the operation 1.

In the embodiment, for the grant of the Msg3, the base station may configure multiple opportunities of sending attempt or repetition number. If the base station configures multiple opportunities of sending attempt, then the UE needs to send the Msg3 based on the result of the LBT, and the Msg3 is sent only once. If the base station configures the repetition number, the UE sends the Msg3 based on the result of the LBT. The number of times of sending the Msg3 is related to the result of performing the LBT, and the Msg3 may be sent multiple times.

At operation 4, the base station receives the Msg3 on one or more indicated BWPs, and generates an Msg4 after the Msg3 is received successfully. Then, the DL BWP is selected according to the channel occupancy rate or the failure or success rate of the LBT. After the selection of BWP is completed, the base station sends the Msg4 on the selected BWP.

In the operation, the selection based on the channel occupancy rate or the failure or success rate of the LBT is the same as that described in the operation 2.

At operation 5, after the UE receives the Msg4, if a contention resolution is successful, then an appropriate BWP needs to be selected to send a feedback for the Msg4.

In the operation, the BWP may be selected according to a measurement result, a channel occupancy rate or a failure or success rate of the LBT.

Implementation mode 2 (selecting from multiple BWPs in a cell, one BWP being selected, applied to the case of 2-step RACH)

To increase a random access success rate, the BWP is selected before each message is sent. In the implementation mode, a 2-step RACH process is taken as an example. The implementation mode includes the following operations.

At operation 1, the UE selects a BWP according to a threshold, a channel occupancy rate, the number of successful LBT, or the number of failed LBT. For example, the BWP with low load is selected based on the channel occupancy rate. After the selection, the preamble and (PRACH resources are selected according to the RACH common configuration information of the BWP. After the selection is completed, the selection result is indicated to the lower layer, and then the lower layer sends the Msg1 (corresponding to the preamble and Msg3 in the RACH process) to the base station according to the indication from the MAC.

As another example, if RSRP of a downlink measurement result for a BWP exceeds a certain threshold, the BWP may be selected as a candidate BWP. If there are multiple BWPs meeting conditions, other factors may be taken into account to perform further selection or a random one of the multiple BWPs may be selected.

As another example, the channel occupancy rate includes the occupancy of channel by this node and other nodes. For example, Received Signal Strength Indication (RSSI) measurement is performed, the measurement result is compared with a threshold, and if the measurement result exceeds a certain threshold, it is considered that the channel is occupied. The channel occupancy rate within a period of time is detected, and if the channel occupancy rate reaches a certain threshold, the load is considered to be heavy.

At operation 2, after receiving the Msg1 from the BWP, the base station generates a corresponding Msg2, which includes a TA, a Temporary C-RNTI (TC-RNTI), a contention resolution, and so on (corresponding to the Msg2 and Msg4 in the 4-step RACH process). Then, the base station may select a DL BWP for sending the Msg2 based on a channel occupancy rate or a failure or success rate of the LBT.

For example, energy or signal detection is performed at the base station side, if the detection result exceeds a certain threshold, it is considered that the channel is occupied. The channel occupancy rate within a period of time is detected, and if the channel occupancy rate reaches a certain threshold, the load is considered to be heavy.

As another example, statistics on the results of LBT within a period of time are collected at the base station side, for example, the number of performing the LBT, the number of successful LBT and the number of failed LBT within 200 ms are counted, and then the failure or success rate of the LBT are calculated based on the counting result. When the success rate of LBT reaches a certain threshold, the BWP may be selected as the DL BWP used for sending the MAC RAR. If multiple BWPs are selected, other factors may be taken into account to perform further selection or a random one of the multiple BWPs may be selected.

At operation 3, after the UE receives the Msg2, if the contention resolution is successful, then an appropriate Uplink (UL) BWP needs to be selected to send a feedback for the Msg2.

In the operation, the carrier or the BWP may be selected according to a threshold, a channel occupancy rate, the number of failed LBT, or the number of successful LBT.

Implementation mode 3 (selecting from multiple carriers and multiple BWPs, each process involving the selection of the carrier and the BWP, but each message being sent only on the BWP of the selected carrier, applied to the case of 4-step RACH)

If the UE is configured with multiple uplink carriers and downlink carriers, in order to increase the success rate of random access, the carrier may be selected before each message is sent in the random access process, taking 4-step RACH process as an example.

At operation 1, the UE selects a carrier and a BWP based on a measurement result of each uplink carrier, or statistics of a channel occupancy rate, or a failure or success rate of the LBT. That is, a carrier selection process involves the selection of the BWP and the carrier and the BWP may be selected together. After the selection of the carrier and the BWP on the corresponding carrier is completed, the UE selects the preamble and PRACH resources based on the RACH common configuration of the BWP on the carrier. When the preamble transmission occasion arrives, the selected carrier, BWP, and preamble are indicated to the lower layer, and the lower layer sends the preamble to the base station according to the indication from the MAC.

At operation 2, after the base station receives the preamble, the base station first selects a carrier and BWP used by the Msg3, and allocates the resources on the BWP of the selected carrier to generate the MAC RAR message. Then, the base station may select the downlink carrier and BWP for sending the Msg2 according to a measurement result, a channel occupancy rate or a failure or success rate of the LBT.

In the operation, there are several schemes for the selection of the carrier and BWP used by the Msg3.

In scheme 1, the base station may allocate the resources used by the Msg3 on the BWP of the carrier on which the preamble is received.

In scheme 2, the base station may select one or more carriers according to the measurement result of the uplink carrier and the BWP, may select only one BWP for each carrier, and allocate the resources used by the Msg3 on the BWP of the selected carrier(s).

In scheme 3, the base station may select one carrier according to the measurement result of the uplink carrier and the BWP, may select multiple BWPs on the corresponding carrier, and allocate the resources used by the Msg3 on the multiple BWPs corresponding to the selected carrier.

In scheme 4, the base station may select multiple carriers according to the measurement result of the uplink carrier and the BWP, may select multiple BWPs for each carrier, and allocate the resources used by the Msg3 on the multiple BWPs of the selected carriers.

At operation 3, after the UE receives the MAC RAR, if the MAC RAR is parsed successfully and the preamble matches, it means that the Msg2 is received successfully. The UE sends the Msg3 according to a resource indication in the MAC RAR. If the base station indicates one BWP of one carrier, then the UE sends the Msg3 on the corresponding resource. If the base station indicates multiple BWPs of one carrier or one or more BWPs of multiple carriers, the UE may select the carrier and the BWP according to a measurement result, a channel occupancy rate, or a failure or success rate of the LBT. After the selection is completed, the UE sends the Msg3 on the BWP of the corresponding carrier.

At operation 4, after receiving the Msg3, the base station generates a corresponding Msg4. Before the Msg4 is sent, the base station needs to select the downlink carrier and the BWP according to a measurement result, a channel occupancy rate or a failure or success rate of the LBT. After the selection is completed, the base station sends the Msg4 on the BWP of the selected carrier.

At operation 5, after the UE receives the Msg4, if the contention resolution is successful, the UE needs to select the uplink carrier and the BWP. The feedback for the Msg4 may be sent by using the carrier and the BWP for sending the Msg3. Alternatively, the feedback for the Msg4 may also be sent according to a channel occupancy rate or a failure or success rate of the LBT.

Implementation mode 4 (the MAC RAR indicating locations of the resources used by the Msg3 on multiple carriers or multiple BWPs)

According to the implementation mode 1, when the base station selects multiple carriers or BWPs to allocate the resources used by the Msg3, the resources of multiple carriers or BWPs need to be indicated. In addition to indicating the resource location, it is also needed to indicate the selected carrier(s) or BWP(s).

Figure 6:
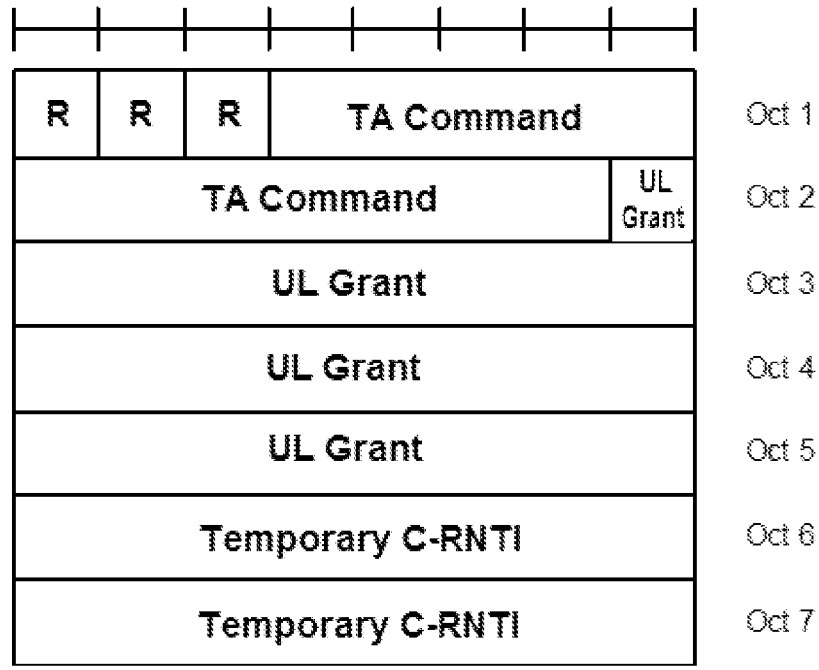
FIG. 6 is a schematic diagram of Media Access Control (MAC) Random Access Response (RAR) format in related technologies of the present application.

The content of the UL grant defined by NR is shown in FIG. 6. FIG. 6 is a schematic diagram of an MAC RAR format in related technologies of the present application.

In the table, the UL grant occupies 25 bits. If a maximum of four carriers or BWPs are to be indicated, then 2 indication bits are needed, that is, 27 bits are needed to indicate the UL grant for each carrier or BWP. Because the existing UL grant may be 1, 2, 3 or 4, the MAC RAR message is variable, and the MAC RAR format needs to be designed for each of the four cases.

Figure 7:
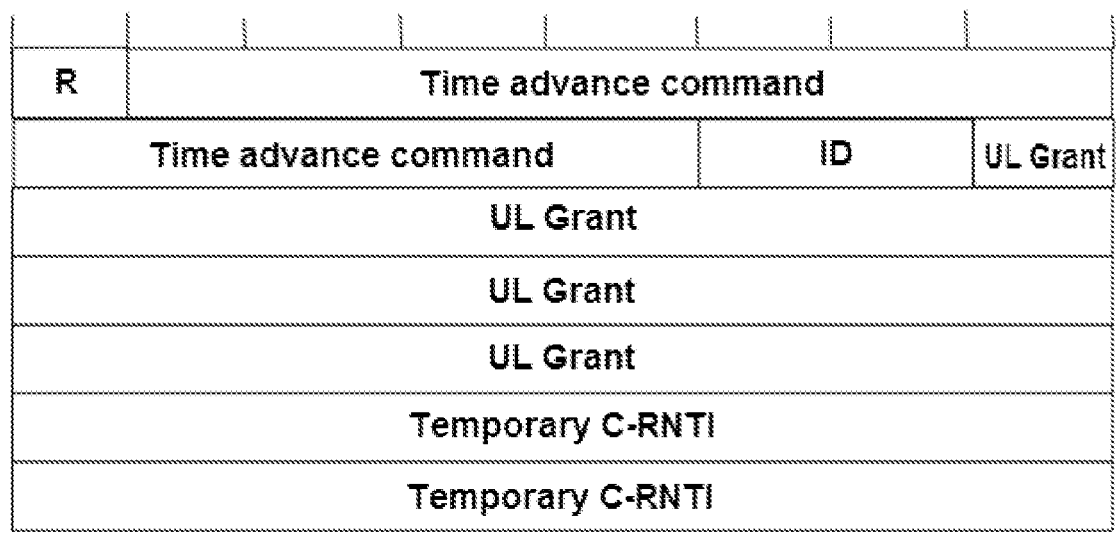
FIG. 7 is a schematic diagram of an MAC RAR format indicating one carrier/BWP in an embodiment of the disclosure.

When one carrier or BWP is selected, the MAC RAR format is shown in FIG. 7. FIG. 7 is a schematic diagram of a MAC RAR format indicating one carrier/BWP in the embodiments of the disclosure. The ID in FIG. 7 is the ID of the carrier/BWP on which the resources used by the Msg3 are allocated.

When two carriers or BWPs are selected, the MAC RAR format is shown in FIG. 8. FIG. 8 is a schematic diagram of a MAC RAR format indicating two carriers/BWPs in the embodiments of the disclosure. The TAC is Time Advance Command, and the ID is the ID of the carriers/BWPs allocated for transmitting the Msg3.

When three carriers or BWPs are selected, the MAC RAR format is shown in FIG. 9. FIG. 9 is a schematic diagram of a MAC RAR format indicating three carriers/BWPs in the embodiments of the disclosure.

When four carriers or BWPs are selected, the MAC RAR format is shown in FIG. 10. FIG. 10 is a schematic diagram of a MAC RAR format indicating four carriers/BWPs in the embodiments of the disclosure.

The above MAC RAR format, designed according to the selected carrier/BWP, is merely an example, and the format for the MAC RAR is not limited to the MAC RAR format given herein.

Implementation mode 5 (the LBT fails, the UE reports, an RAR window is not started, and the next RACH process is initiated)

After selecting a PRACH resource and a preamble code, the MAC at the UE side sends the selection to the lower layer when the preamble sending occasion is approaching. Because the LBT needs to be performed, the MAC needs to set aside some time for the lower layer. When the LBT fails, the lower layer needs to indicate LBT failure to the MAC. After the MAC receives the indication for the LBT failure, the RAR window may not be started yet. In this case, the MAC may initiate the next random access process. That is, after the MAC receives the LBT failure, it can be considered that the current random access fails, and the following process is performed.

After the MAC receives the LBT failure, it is considered that the random access fails, then the preamble transmission counter is incremented by 1 and it is determined whether the number of preamble transmissions reaches the maximum number of retransmissions. If the maximum number of retransmissions is reached, a random access problem is indicated to the upper layer. If the maximum number of retransmissions is not reached, a random backoff time is selected to perform the next random access process.

In this case, when the next random access process is initiated, PREAMBLE_POWER_RAMPING_COUNTER is not incremented by 1.

Implementation mode 6 (the preamble is not transmitted due to the LBT failure, and a counter is introduced)

When the preamble is indicated to the lower layer, but the lower layer does not successfully transmit the preamble due to the LBT failure, then the lower layer needs to give an indication of LBT failure to the upper layer. After the MAC receives the indication of LBT failure, preamble power ramping counter is not incremented, that is, PREAMBLE_POWER_RAMPING_COUNTER is not incremented. At the same time, the number of preamble transmissions, namely PREAMBLE_TRANSMISSION_COUNTER, is not incremented.

If the LBT keeps failing, then the RACH process remains deadlocked, and for a dedicated preamble, the base station has no way to recycle the dedicated preamble. Here, another counter, namely an LBT failure counter, is introduced, which means that each time the lower layer reports the LBT failure, the MAC adds 1 for the LBT failure counter. When the LBT failure counter reaches a certain threshold or PREAMBLE_TRANSMISSION_COUNTER is above preambleTxMax, the MAC reports a random access problem to the upper layer.

The threshold for the LBT failure counter may be defined in RACH-ConfigCommon or RACH-ConfigGeneric. For example, the threshold may be defined according to the following structure:

```
RACH-ConfigGeneric ::=        SEQUENCE {
    prach-ConfigurationIndex      INTEGER (0..255),
    msg1-FDM                      ENUMERATED {one, two, four, eight},
    msg1-FrequencyStart           INTEGER
(0..maxNrofPhysicalResourceBlocks-1),
    zeroCorrelationZoneConfig     INTEGER(0..15),
    preambleReceivedTargetPower       INTEGER (-200..-74),
    preambleTransMax              ENUMERATED {n3, n4, n5, n6, n7,
    n8, n10, n20, n50, n100, n200},
    -- Power ramping steps for PRACH (see 38.321,5.1.3)
    powerRampingStep              ENUMERATED {dB0, dB2, dB4, dB6},
    ra-ResponseWindow             ENUMERATED {sl1, sl2, sl4, sl8, sl10,
sl20, sl40, sl80}
    LBTFailureMax                     ENUMERATED {n3, n4,
n5, n6, n7, n8, n10,n20, n50}
}
```

The value for the LBTFailureMax defined here is not limited to the value in the above example.

Implementation mode 7 (the transmission or retransmission of the Msg3 fails, due to the LBT, the LBT failure is reported, and the power does not ramp)

After the UE receives a retransmission grant of the Msg3 or the MAC RAR, the UE may not be able to send the message due to the LBT failure, and in this case the lower layer may report the LBT failure to the MAC. When the number of times that the MAC receives the LBT failure reaches the maximum number of retransmissions of the Msg3, it means that the cell load is heavy or the channel condition is not good at present. In this case, the power does not ramp, the number of preamble transmissions may be incremented or not incremented. If the LBT failure counter is defined, in this case, the LBT failure counter is incremented by 1.

Implementation mode 8 (repetition of retransmission of the Msg3) In order to improve the transmission reliability of the Msg3, repetition K and repetition RV may be added. The repetition K and repetition RV may be indicated in a system message or a retransmission grant of the Msg3.

If the repetition K and repetition RV are indicated in the retransmission grant of the Msg3, then fields defined in a retransmission Physical Downlink Control Channel (PDCCH) message of the Msg3 may be shown in Table 1.

TABLE 1

| Field | Bits |
|---|---|
| Identifier for DCI formats | |
| Frequency domain resource assignment | |
| Time domain resource assignment | |
| Frequency hopping flag | |
| Modulation and coding scheme | |

TABLE 1-continued

| Field | Bits |
|---|---|
| New data indicator | |
| Redundancy version (RV) | |
| HARQ process id (HARQ proc) | |
| Transmission power control (TPC for PUSCH) | |
| Uplink/subsidiary uplink (UL/SUL) | |
| repetitionK | |
| Repetition redundancy version (repetitionRV) | |

Implementation mode 9 (multiple opportunities and one transmission) To increase the transmission opportunity of the Msg3, the base station may indicate the transmission opportunity in a system message, or an MAC RAR, or a retransmission grant of the Msg3. After the UE receives transmission opportunity, the LBT is performed on the transmission opportunity indicated by the base station. If the LBT succeeds, the Msg3 is transmitted, here the Msg3 is transmitted only once, and the UE does not use the later grant, so that the grant may be released for other nodes to use. A behavior of the UE needs to be constrained here. When the LBT succeeds at the lower layer, LBT success is indicated to the MAC. After MAC receives the LBT success, at the next moment or transmission opportunity, the MAC will not indicate data to the lower layer, so that the lower layer will not perform transmission. In this case, the MAC still needs to cache a data packet of the Msg3 for the retransmission in case of failure.

In addition to the transmission opportunity, the RV used also needs to be indicated. When the RV is indicated through the system message, an Information Element (IE), for example, Msg3TransOpportunity, needs to be added in RACH-ConfigCommon of a System Information Block 1 (SIB1). The following definition may be used:

```
RACH-ConfigCommon ::=             SEQUENCE {
    -- Generic RACH parameters
    rach-ConfigGeneric            RACH-ConfigGeneric,
    totalNumberOfRA-Preambles         INTEGER (1..63) OPTIONAL,--
Need S
    Msg3TransOpportunity          ENUMERATED {n1, n2, n4, n8}
}
```

If the retransmission opportunity is indicated through the MAC RAR, the definition as shown in Table 2 may be adopted.

TABLE 2

| | NR |
|---|---|
| Reserved | 3 |
| Timing advance | 12 |
| Hopping flag | 1 |
| Frequency domain RA | 12 |
| Time domain RA | 4 |
| Truncated MCS | 4 |
| TPC command | 3 |
| CSI request | 1 |
| TC-RNTI | 16 |
| Msg3 transmission opportunity (Msg3TransOpportunity) | 2 |
| Redundancy version (RV) | |

If the field is added to the retransmission grant of the Msg3, the definition as shown in Table 3 may be adopted.

TABLE 3

| Field | Bits |
|---|---|
| Identifier for DCI formats | |
| Frequency domain resource assignment | |
| Time domain resource assignment | |
| Frequency hopping flag | |
| Modulation and coding scheme | |
| New data indicator | |
| Redundancy version (RV) | |
| HARQ process (HARQ proc) | |
| Transmission power control (TPC for PUSCH) | |
| Uplink/subsidiary uplink (UL/SUL) | |
| Msg3 transmission opportunity (Msg3TransOpportunity) | |

Implementation mode 10 (selecting from multiple BWPs in a cell, one or more BWPs being selected to perform LBT, but the message being sent on a BWP in the end, applied to the case of 4-step RACH)

To increase the random access success rate, the BWP is selected before each message is sent. A main scenario of the implementation mode is the selection of multiple BWPs in a cell, taking the 4-step RACH process as an example.

At operation 1, the UE selects the BWP according to a threshold, a channel occupancy rate or a failure or success rate of the LBT. For example, the BWP with low load is selected based on the channel occupancy rate. There may be one or more BWPs that meet the conditions, and the preamble and PRACH resources are selected based on the RACH common configuration information of the one or more BWPs that meet the conditions. The UE indicates a selection result to the lower layer, and the lower layer may perform the LBT on one or more BWPs. If the LBT of multiple BWPs succeeds, the lower layer selects one of the BWPs, the LBT of which successes, to send the Msg1.

As another example, if RSRP of a downlink measurement result for a BWP exceeds a certain threshold, the BWP may be selected as the candidate BWP. As another example, energy or signal detection is performed at the UE side, if the detection result exceeds a certain threshold, it is considered that the channel is occupied. The channel occupancy rate within a period of time is detected, and if the channel occupancy rate reaches a certain threshold, the load is considered to be heavy.

As another example, statistics on the LBT results within a period of time may be collected to obtain the failure or success rate of the LBT. For example, the total number of LBT, the number of successful LBT and the number of failed LBT within 200 ms may be counted, and then the failure or success rate of the LBT may be calculated. The base station may configure a selection threshold, and then perform selection according to the threshold and the counted failure rate and success rate of the LBT.

At operation 2, after receiving the Msg1 from the BWP, the base station allocates the resources used by the Msg3, and generates the MAC RAR message. Then, the base station selects the DL BWP for sending the MAC RAR.

In the operation, when allocating the resources used by the Msg3, the base station may allocate resources used by the Msg3 on the UL BWP used by the Msg1, or select a UL BWP based on the uplink measurement result and then allocate the resources used by the Msg3 on the selected UL BWP. Alternatively, the base station selects multiple UL BWPs, and allocates the resources used by the Msg3 on all the multiple UL BWPs. After the selection is completed, the selection result is carried in the MAC RAR message.

As an example, the energy or signal detection is performed at the base station side, if it exceeds a certain threshold, it is considered that the channel is occupied. The channel occupancy rate within a period of time is detected, and if the channel occupancy rate reaches a certain threshold, the load is considered to be heavy.

As an example, statistics on the results of LBT within a period of time are collected at the base station side, for example, the number of performing the LBT, the number of successful LBT and the number of failed LBT within 200 ms are counted, and then the failure or success rate of the LBT are calculated based on the counting result.

In the embodiment, for the selection of the DL BWP, the base station may select one or more DL BWPs according to certain conditions and perform the LBT on one or more BWPs. If the LBT succeeds, the Msg2 is sent. Of course, for each BWP, the LBT may be attempted several times until the LBT succeeds, but the maximum number of attempts cannot be exceeded. The Msg2 is only sent once.

At operation 3, after receiving a Msg2, the UE parses the Msg2, and performs preamble matching. If the Msg2 is received successfully, the UE generates the corresponding Msg3. Then the UE selects the BWP used by the Msg3 according to the indication in the Msg2. If there is only one BWP, then the UE sends the Msg3 on the BWP. If multiple BWPs are indicated, the UE may perform the LBT on multiple BWPs. If there is a BWP on which the LBT succeeds, the BWP is selected to send the Msg3.

In the operation, the failure or success rate of the LBT is the same as that described in the operation 1.

In the operation, for the grant of the Msg3 on each BWP, multiple transmission opportunities or multiple repetitions may be configured. If the base station configures multiple transmission opportunities, the UE performs the LBT. If the LBT succeeds, the Msg3 may be sent and the sending is performed only once. The number of times of performing the LBT does not exceed the configured maximum number of attempt opportunities, as the implementation mode 9. If the base station configures multiple repetitions, the UE performs the LBT, and the Msg3 is sent if the LBT succeeds, and then the Msg3 is transmitted repeatedly according to whether the configured number of times is reached, as the implementation mode 8.

At operation 4, the base station receives the Msg3 on one or more indicated BWPs, and generates the Msg4 after the Msg3 is received successfully. Then, the DL BWP is selected according to the channel occupancy rate or the failure or success rate of the LBT. After the selection of BWP is completed, the UE sends the Msg4 on the selected BWP.

In the operation, the definition for the channel occupancy rate and the failure or success rate of the LBT is the same as that described in S2.

In the operation, the base station selects one or more BWPs according to the channel occupancy rate or the failure or success rate of the LBT, and performs the LBT on one or more BWPs. If the LBT of more than one BWP succeeds, the base station selects only one BWP to send the Msg4.

At operation 5, after the UE receives the Msg4, if the contention resolution is successful, then an appropriate BWP needs to be selected to send the feedback for the Msg4.

In the operation, the BWP may be selected according to a measurement result, a channel occupancy rate or a failure or success rate of the LBT. The UE may select one or more UL BWPs, and perform the LBT on one or more BWPs. If the LBT of multiple BWPs succeeds, only one of BWP, the LBT of which succeeds, is selected to send the feedback.

Implementation mode 11 (selecting from multiple BWPs in a cell, selecting one or more BWPs to perform the LBT, applied to the case of 2-step RACH)

To increase the random access success rate, the BWP is selected before each message is sent. In the implementation mode, the 2-step RACH process is taken as an example.

At operation 1, the UE selects the BWP according to a threshold, a channel occupancy rate or a failure or success rate of the LBT. For example, the BWP with low load is selected based on the channel occupancy rate. There may be one or more BWPs that meet the conditions, and the preamble and PRACH resources are selected based on the RACH common configuration information of the one or more BWPs that meet the conditions. The MAC indicates the preamble and PRACH resources selected on one or more BWPs to the lower layer. The lower layer performs the LBT according to the indication. If the LBT of multiple BWPs succeeds, then a BWP, the LBT of which succeeds, is selected to send the Msg1 (corresponding to the preamble and the Msg3 in the 4-step RACH process), and the LBT for other selected BWPs, the LBT of which is not yet performed, is abandoned.

In the operation, if the RSRP of a downlink measurement result for a BWP exceeds a certain threshold, the BWP may be selected as the candidate BWP.

As another example, the energy or signal detection is performed at the UE side, if the detection result exceeds a certain threshold, it is considered that the channel is occupied. The channel occupancy rate within a period of time is detected, and if the channel occupancy rate reaches a certain threshold, the load is considered to be heavy.

As another example, statistics on the LBT results within a period of time may be collected to obtain the failure or success rate of the LBT. For example, the total number of LBT, the number of successful LBT and the number of failed LBT within 200 ms may be counted, and then the failure or success rate of the LBT may be calculated.

At operation 2, after receiving the Msg1 from the BWP, the base station generates a corresponding Msg2, which includes a TA, a Temporary C-RNTI (TC-RNTI), a contention resolution, and so on (corresponding to the Msg2 and Msg4 in the 4-step RACH process). Then, the base station may select the DL BWP for sending the Msg2 based on a channel occupancy rate or a failure or success rate of the LBT.

As an example, the energy or signal detection is performed at the base station side, if the detection result exceeds a certain threshold, it is considered that the channel is occupied. The channel occupancy rate within a period of time is detected, and if the channel occupancy rate reaches a certain threshold, the load is considered to be heavy.

As another example, statistics on the results of LBT within a period of time are collected at the base station side, for example, the number of performing the LBT, the number of successful LBT and the number of failed LBT within 200 ms are counted, and then the failure or success rate of the LBT are calculated based on the counting result.

In the operation, for the selection of the DL BWP, the base station may select one or more DL BWPs according to certain conditions and perform the LBT on one or more BWPs. If there are more than one BWP on which the LBT succeeds, one BWP is selected to send the Msg2.

At operation 3, after the UE receives the Msg2, if the preamble matches and the contention resolution is successful, then an appropriate uplink BWP needs to be selected to send the feedback for the Msg2.

In the operation, the carrier or the BWP may be selected according to the measurement result, the channel occupancy rate, the number of successful LBT, or the number of failed LBT. The UE may select one or more UL BWPs, and perform the LBT on one or more BWPs. If the LBT of multiple BWPs succeeds, only one of BWP, the LBT of which succeeds, is selected to send the feedback.

Implementation mode 11 (selecting from multiple BWPs in a cell, selecting one or more BWPs to perform the LBT, applied to the case of 2-step RACH)

In the NR, the RAR window is defined to be at most 10 ms. On an unauthorized carrier, because the LBT needs to be performed for both the transmission of the preamble and the transmission of the MAC RAR, the RAR window of 10 ms may not be enough. To increase the opportunity of receiving the RAR, expanding a random access response window may be taken into account.

At present, the calculation formula in the definition for a Random Access-Radio Network Temporary Identity (RA-RNTI) in the NR is as follows.

The RA-RNTI associated with the PRACH, in which a random access preamble is transmitted, is computed as:

$$RA\text{-}RNTI=1+s\_id+14 \times t\_id+14 \times 80 \times f\_id+14 \times 80 \times 8 \times ul\_carrier\_id,$$

where $s\_id$ is the index of the first OFDM symbol of the specified PRACH occasion ($0 \leq s\_id < 14$), $t\_id$ is the index of the first slot of the specified PRACH opportunity in a system frame ($0 \leq t\_id < 80$), fid is the index of the specified PRACH opportunity in a frequency domain ($0 \leq f\_id < 8$), and $ul\_carrier\_id$ is the UL carrier used for Msg1 transmission (0 for NUL carrier, and 1 for SUL carrier).

If the RAR window is expanded to X ms, then the value range of $t\_id$ is $0 \leq t\_id < X*8$. For example, if the RAR window is expanded to 15 ms, then the value range of $t\_id$ is $0 \leq t\_id < 120$. As another example, if the RAR window is expanded to 20 ms, the value range of $t\_id$ is $0 \leq t\_id < 160$.

Implementation mode 12 (setting of BWP set) In the above implementation mode, in random access process, BWP needs to be selected for the Msg2 and the Msg4, but the base station cannot distinguish which UE the message in the random access process comes from, so the base station cannot select the BWP according to the configuration of each UE. If some BWPs are selected based on the channel condition or the failure or success rate of the LBT, it is possible that the BWP actually transmitting data is not the DL BWP configured to the UE, which will result in unsuccessful reception of message.

A solution is considered here, that is, the BWPs can be grouped, so that once the base station receives the preamble or the Msg3 on a certain UL BWP, the DL BWPs may be selected from the corresponding group. For example, the base station has 8 UL BWPs (UL BWP1 to UL BWP8) and 8 DL BWPs (DL BWP1 to DL BWP8), and there is a corresponding relationship between the UL BWPs and the DL BWPs, for example, UL BWP1 to UL BWP8 correspond to DL BWP1 to DL BWP8 respectively. UL BWP1 to UL BWP4 and DL BWP1 to DL BWP4 are set as one group, namely group A; UL BWP5 to UL BWP8 and DL BWP5 to DL BWP8 are set as one group, namely group B. For example, if the UE selects the UL BWP1 to send the preamble, then when the base station receives the preamble from the UL BWP1, the base station generates the MAC RAR. The base station selects the DL BWP from the group A to which the UL BWP1 belongs according to the channel occupancy rate or the failure or success rate of the LBT, and performs the LBT on the selected DL BWP. If the LBT succeeds, the Msg2 is sent.

For the Msg4, if the base station cannot distinguish which UE the Msg3 comes from after parsing the Msg3, then the group to which the UE belongs may be determined according to the UL BWP sending the Msg3. The base station selects the DL BWP in the group according to the channel occupancy rate or the failure or success rate of the LBT, and performs the LBT on the selected BWP. If the LBT succeeds, the Msg4 is sent.

When configuring BWPs to the UE, if a BWP in a group needs to be configured to the UE, it is needed to configure all the parameters on the BWP in the group that involve the random access process to the UE, or else, once a certain BWP is selected but the relevant configuration for the BWP does not exist, the message cannot be sent or received. If certain BWPs are not used for data transmission, the configuration of relevant data transmission may not be required.

Implementation mode 13 (adding multiple BWP indexes in a PDCCH order)

For the random access process triggered by a PDCCH order, in order to increase the transmission opportunity of the preamble, multiple BWPs may be indicated in the PDCCH order).

At present, a standard conclusion of NR protocol only includes a preamble index, an SSB index and a PRACH MASK index. If more BWP information needs to be added, the following schemes may be adopted.

In scheme 1, the information for each BWP follow the following structure: BWP index, preamble index, SSB index, and PRACH MASCK index.

In scheme 2, the preamble index is common to multiple BWPs, and each BWP includes the parameters such as the BWP index, the SSB index, and the PRACH MASK index.

In scheme 3, the BWP index, the SSB index, and the PRACH MASK index are common to multiple BWPs, and only multiple BWP indexes are included.

Implementation mode 14 (indicating multiple SSB indexes in the PDCCH order) To increase the transmission opportunity of the preamble, multiple resource locations may be indicated using the following schemes.

In scheme 1, the PRACH MASK index is common, and each information structure includes the preamble index and the SSB index.

In scheme 2, the preamble index and the PRACH MASK index are common, and multiple SSB indexes are indicated.

Through the enhanced schemes in the above embodiments, the access or synchronization delay of the UE may be reduced.

Embodiment 4

The embodiments of the present application also provide a storage medium. The storage medium stores a computer program. The computer program is configured to perform, when running, operations in any of the above method embodiments.

In exemplary implementations of the embodiment, the storage medium may be set to store a computer program for performing the following operations.

At operation S1, in a random access process, a first resource is selected from multiple radio resources, and a first message is sent to a base station by using the first resource. The radio resources include either or a combination of: BWPs and carrier resources.

At operation S2, a second message sent by the base station is received. The second message carries indication information of a second resource.

In exemplary implementations of the embodiment, the storage media include, but not limited to, a USB flash disk, a Read-Only Memory (ROM), a Random Access Memory (RAM), a mobile hard disk, a magnetic disk, a compact disc, and other media capable of storing the computer program.

The embodiments of the present application also provide an electronic device, which includes a memory and a processor. The memory stores a computer program. The processor is configured to run the computer program to perform operations in any of the above method embodiments.

In exemplary implementations of the embodiment, the electronic device may also include a transmission device and an input/output device. The transmission device is connected with the processor, and the input/output device is connected with the processor.

In exemplary implementations of the embodiment, the processor may be configured to perform the following operations through the computer program.

At operation S1, in a random access process, a first resource is selected from multiple radio resources, and a first message is sent to the base station by using the first resource. The radio resources include either or a combination of: BWPs and carrier resources.

At operation S2, a second message sent by the base station is received. The second message carries indication information of a second resource.

In an exemplary embodiment, the specific examples in the present embodiment may refer to the examples described in the above embodiments and alternative embodiments.

It is apparent that those skilled in the art should appreciate that the above modules and operations of the disclosure may be implemented by a general-purpose computing device, and they may be centralized in a single computing device or distributed on a network composed of multiple computing devices. Optionally, they may be implemented by a program code which is capable of being performed by the computing device, so that they may be stored in a storage device and performed by the computing device. In some situations, the presented or described operations may be performed in an order different from that described here; or they are made into integrated circuit modules, respectively; or multiple modules and operations of them are made into a single integrated circuit module. Therefore, the present application is not limited to any particular combination of hardware and software.

The above are only the exemplary embodiments of the disclosure and are not intended to limit the disclosure; for those skilled in the art, the disclosure may have various modifications and changes. Any modifications, equivalent replacements, improvements and the like within the principle of the present application should fall within the protection scope of the claims of the present application.

What is claimed is:

1. A random access method, comprising:
in a random access process, sending a first message to a base station by using a first resource;
receiving a second message sent by the base station, wherein the second message carries indication information of a second resource;
the method further comprises:
when Listen Before Talk (LBT) fails, indicating, by a lower layer, LBT failure to a Media Access Control (MAC); and
after receiving indication for the LBT failure, in a case where a Random Access Response (RAR) window is not started yet, initiating, by the MAC, a next random access process.

2. The method as claimed in claim 1, wherein sending the first message to the base station by using the first resource comprises:
sending a preamble to the base station by using the first resource.

3. The method as claimed in claim 1, wherein receiving the second message sent by the base station comprises one of the following:
receiving a Media Access Control (MAC) Random Access Response (RAR) sent by the base station; and
receiving a Time Advance (TA), a Temporary Cell Radio Network Temporary Identifier (TC-RNTI), and a contention resolution sent by the base station.

4. The method as claimed in claim 1, wherein the second message carries a resource location of the second resource and a resource identifier of the second resource.

5. The method as claimed in claim 1, after receiving the second message sent by the base station, further comprising:
sending a third message to the base station by using the second resource.

6. The method as claimed in claim 5, wherein when the third message is Msg3, sending the third message to the base station by using the second resource comprises:
sending the Msg3 based on a result of performing LBT on the second resource, and in a case of LBT success, sending the Msg3 repeatedly;
wherein a maximum number of repetitions of sending the Msg3 is carried in the second message.

7. The method as claimed in claim 6, wherein the maximum number of repetitions is configured or carried based on at least one of the following: a system message, a retransmission grant for the Msg3, and an MAC RAR.

8. User Equipment, UE, comprising a memory and a processor, wherein the memory stores a computer program, and the processor is configured to run the computer program to perform the method as claimed in claim 1.

9. The method as claimed in claim 1, wherein before sending the first message to a base station by using the first resource, the method further comprises:
selecting a first resource from multiple radio resources, wherein the radio resources comprise either or a combination of: Band Width Parts (BWPs) and carrier resources.

10. The method as claimed in claim 9, wherein selecting the first resource from the multiple radio resources comprises at least one of the following:
selecting at least one first BWP from multiple BWPs;
selecting at least one first carrier from multiple carrier resources.

11. The method as claimed in claim 1, wherein selecting the at least one first BWP from the multiple BWPs comprises:
selecting the at least one first BWP from the multiple BWPs based on at least one of the following: a BWP selection threshold, a BWP load, and a Listen Before Talk (LBT) count value, wherein the LBT count value is used for indicating a success rate of LBT or a failure rate of LBT;
or,
selecting the at least one first carrier from the multiple carrier resources comprises:
selecting the at least one first carrier from the multiple carrier resources based on at least one of the following: a carrier selection threshold, a carrier load, a success rate of LBT, and a failure rate of LBT.

12. A random access method, comprising:
in a random access process of User Equipment (UE), receiving a first message sent by the UE;
generating a second message;
sending the second message to the UE by using a third resource, wherein the second message carries indication information of a second resource;
the method further comprises:
when Listen Before Talk (LBT) fails, indicating, by a lower layer, LBT failure to a Media Access Control (MAC); and
after receiving indication for the LBT failure, in a case where a Random Access Response (RAR) window is not started yet, initiating, by the MAC, a next random access process.

13. The method as claimed in claim 12, before generating the second message, further comprising one of the following:
selecting the second resource from multiple radio resources;
indicating to the UE that the second resource is a same resource as a resource used for sending the first message, wherein the same resource is a resource, at least one of resource location and resource number of which is the same or different, in a same Uplink (UL) BWP;
wherein the second resource is used for the UE to send a third message.

14. The method as claimed in claim 12, wherein the second resource is used for the UE to send the third message; when the third message is Msg3, the method further comprises:
configuring a maximum number of repetitions of the Msg3 by one of the following: a system message, a Media Access Control (MAC) Random Access Response (RAR) and a retransmission grant of the Msg3, wherein the maximum number of repetitions is used to indicate the maximum number of times that the UE sends the Msg3 repeatedly.

15. A base station, comprising a memory and a processor, wherein the memory stores a computer program, and the processor is configured to run the computer program to perform the method as claimed in claim 12.

16. The method as claimed in claim 12, wherein before sending the second message to the UE by using the third resource, the method further comprises:
selecting the third resource from multiple radio resources, wherein the radio resources comprise either or a combination of: Band Width Parts (BWPs) and carrier resources.

17. The method as claimed in claim 16, wherein selecting the third resource from the multiple radio resources comprises at least one of the following:
selecting at least one third BWP from multiple BWPs;
selecting at least one third carrier from multiple carrier resources.

18. The method as claimed in claim 17, wherein selecting the at least one third BWP from the multiple BWPs comprises:
selecting the at least one third BWP from the multiple BWPs based on at least one of the following: a BWP selection threshold, a BWP load, and a Listen Before Talk (LBT) count value, wherein the LBT count value is used for indicating a success rate of LBT or a failure rate of LBT;

or, selecting the at least one third carrier from the multiple carrier resources comprises:
selecting the at least one third carrier from the multiple carrier resources based on at least one of the following: a carrier selection threshold, a carrier load, a success rate of LBT, and a failure rate of LBT.

19. A non-transitory computer-readable storage medium, storing a computer program, wherein the computer program is configured to perform, when running, the method as claimed in claim 1.

* * * * *